US010920688B2

(12) United States Patent
Llusho et al.

(10) Patent No.: US 10,920,688 B2
(45) Date of Patent: Feb. 16, 2021

(54) VEHICLE INTAKE-MANIFOLD SYSTEM

(71) Applicant: Ford Global Technologies, LLC, Dearborn, MI (US)

(72) Inventors: Lirjon Llusho, St. Clair Shores, MI (US); Mahmoud Yousef Ghannam, Canton, MI (US); Howard Churchwell, Monroe, MI (US); John W. Jensen, Canton, MI (US); John Vincent Fazio, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 26 days.

(21) Appl. No.: 16/476,766

(22) PCT Filed: Jan. 10, 2017

(86) PCT No.: PCT/US2017/012784
§ 371 (c)(1),
(2) Date: Jul. 9, 2019

(87) PCT Pub. No.: WO2018/132082
PCT Pub. Date: Jul. 19, 2018

(65) Prior Publication Data
US 2019/0323440 A1   Oct. 24, 2019

(51) Int. Cl.
*B60K 13/02* (2006.01)
*F02M 35/10* (2006.01)
(Continued)

(52) U.S. Cl.
CPC .......... *F02D 41/0002* (2013.01); *B60K 13/02* (2013.01); *F02D 41/021* (2013.01);
(Continued)

(58) Field of Classification Search
CPC ... B60K 11/04; B60R 19/52; B60R 2019/525; B62D 25/08; B62D 25/085
See application file for complete search history.

(56) References Cited

U.S. PATENT DOCUMENTS

| 2002/0078916 A1 | 6/2002 | Altmann et al. |
| 2002/0083916 A1 | 7/2002 | Maurer et al. |

(Continued)

FOREIGN PATENT DOCUMENTS

GB    2365064 A    2/2002

OTHER PUBLICATIONS

Notification of Transmittal of International Search Report and Written Opinion of the International Searching Authority regarding International Application No. PCT/US2017/012784 dated Apr. 12, 2017 (18 pages).

*Primary Examiner* — Bryan A Evans
(74) *Attorney, Agent, or Firm* — Brandon Hicks; Bejin Bieneman PLC

(57) ABSTRACT

A system in a vehicle includes a primary intake manifold, a secondary intake manifold, a valve, and a computer. The primary and secondary intake manifolds are configured for an engine compartment of the vehicle. The secondary intake manifold is arrangeable to extend from outside the engine compartment to the valve. The valve is connected to each of the primary and secondary intake manifolds. The computer is in communication with the valve and programmed to identify a flood risk and then actuate the valve.

20 Claims, 3 Drawing Sheets

(51) Int. Cl.
 *F02D 41/00* (2006.01)
 *F02D 41/02* (2006.01)
 *F02D 41/22* (2006.01)
 *F02M 35/08* (2006.01)
 *F02M 35/108* (2006.01)

(52) U.S. Cl.
 CPC ........... *F02D 41/22* (2013.01); *F02M 35/088* (2013.01); *F02M 35/108* (2013.01); *F02M 35/10013* (2013.01); *F02M 35/10255* (2013.01); *F02D 2200/702* (2013.01)

(56) References Cited

U.S. PATENT DOCUMENTS

| | | |
|---|---|---|
| 2013/0146381 A1 | 6/2013 | Oosterhuis et al. |
| 2013/0325265 A1 | 12/2013 | Percher |
| 2014/0008136 A1 | 1/2014 | Bennett |
| 2015/0202955 A1* | 7/2015 | Powell .................... B60R 13/06 180/68.3 |

* cited by examiner

VEHICLE INTAKE-MANIFOLD SYSTEM

BACKGROUND

Vehicles with internal-combustion or hybrid drivetrains include intake manifolds. The vehicle has an intake manifold positioned with an inlet facing in a vehicle-forward direction behind a grill at a front end of the vehicle. The inlet draws in air as the vehicle travels, and the intake manifold directs the airflow to combine with fuel. The resulting air-fuel mixture is directed to cylinders in the engine in order to generate energy to power the vehicle.

DETAILED DESCRIPTION

Figure 1:
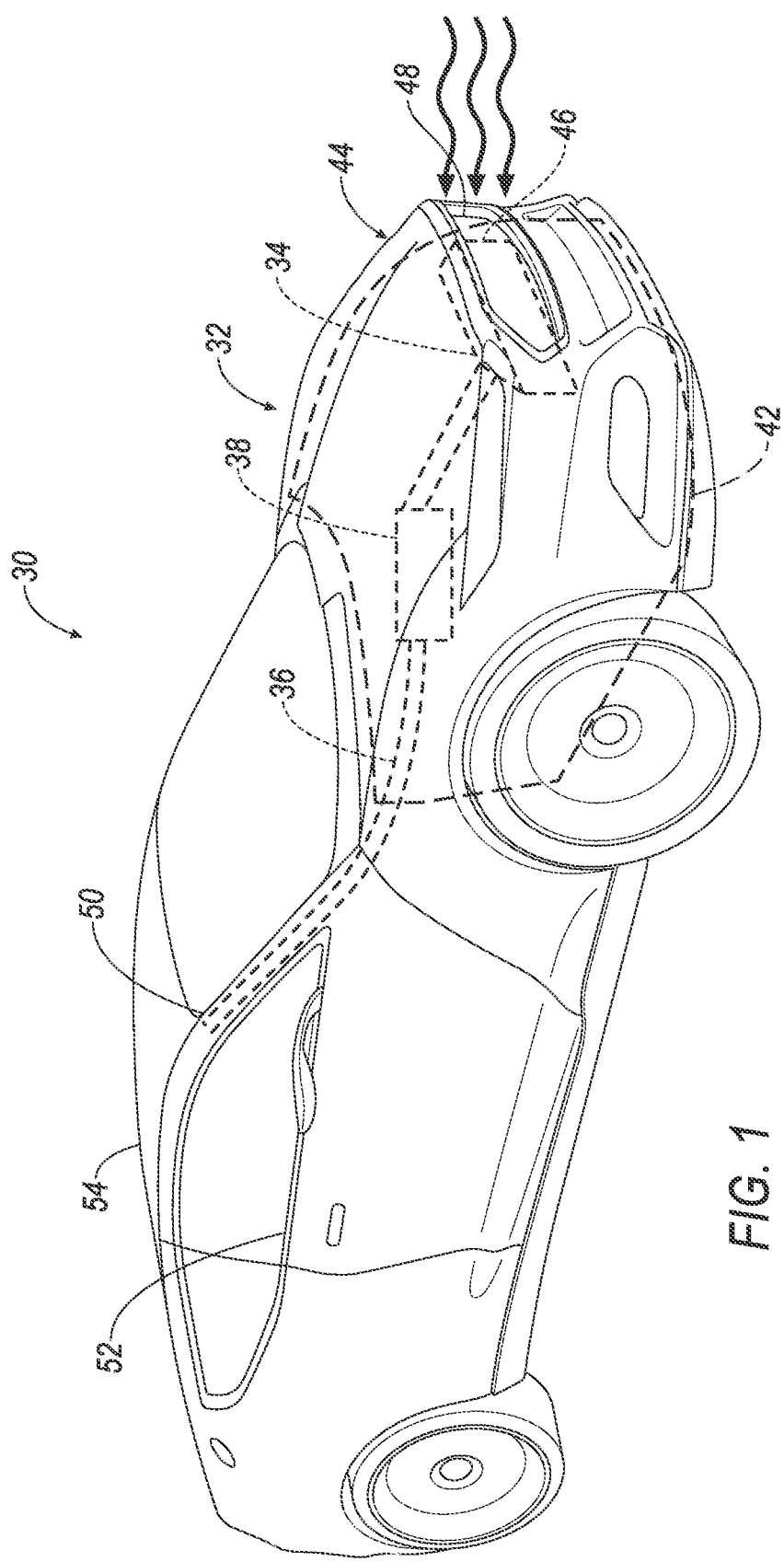
FIG. 1 is a perspective view of an example vehicle.
Figure 2:
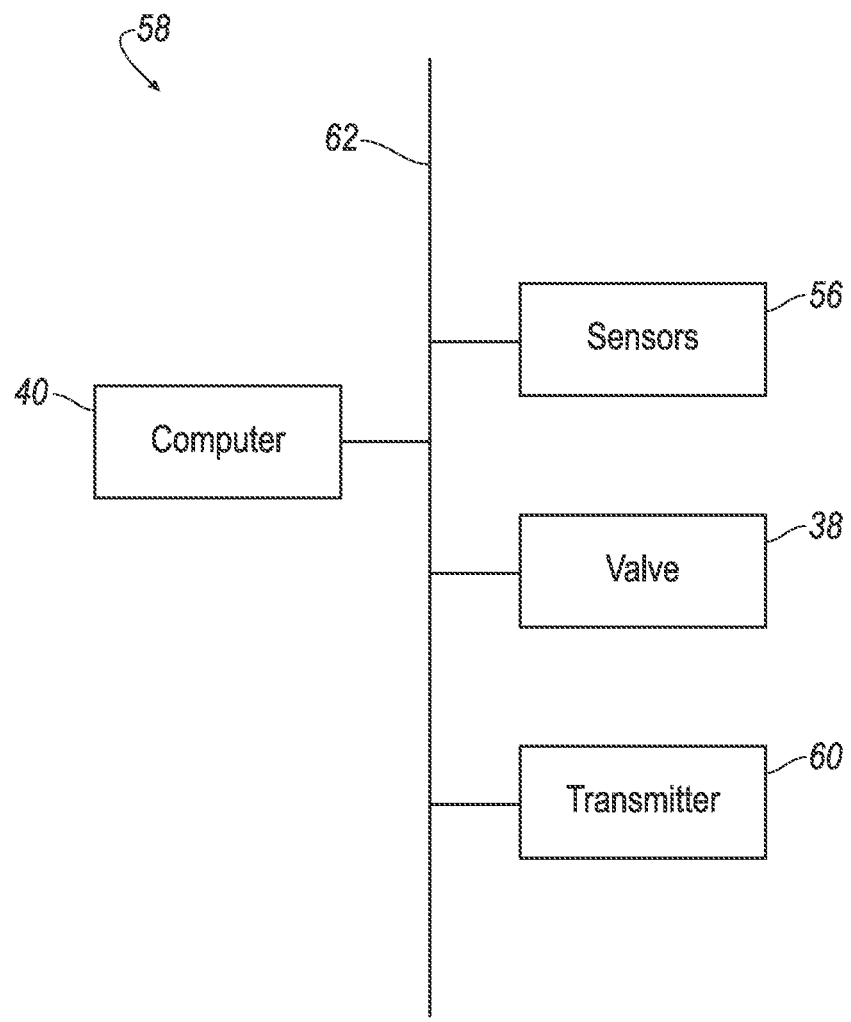
FIG. 2 is a block diagram of a control system of the vehicle of FIG. 1.

With reference to FIGS. 1 and 2, wherein like numerals indicate like parts throughout the views, an intake system 32 in a vehicle 30 includes a primary intake manifold 34, a secondary intake manifold 36, a valve 38, and a computer 40. The primary and secondary intake manifolds 34, 36 are configured for an engine compartment 42 of the vehicle 30. The secondary intake manifold 36 is arrangeable to extend from outside the engine compartment 42 to the valve 38. The valve 38 is connected to each of the primary and secondary intake manifold 36s. The computer 40 is in communication with the valve 38 and programmed to identify a flood risk and then actuate the valve 38.

The intake system 32 can limit damage to engines from water by reducing the likelihood of water flooding the engine through the primary intake manifold 34. The intake system 32 can reduce engine damage and reduce the likelihood of the vehicle 30, and any occupants, becoming stranded.

With reference to FIG. 1, the engine compartment 42 is a cavity in the vehicle 30 sized to accept an engine (not shown) of the vehicle 30. The engine compartment 42 may be defined by a body structure (not shown) of the vehicle 30. The engine compartment 42 may be disposed in a front end 44 of the vehicle 30 in a vehicle-forward direction from a passenger cabin.

The primary intake manifold 34 is configured for the engine compartment 42 of the vehicle 30. In other words, the primary intake manifold 34 is sized and shaped to fit in the engine compartment 42 along with the engine. The primary intake manifold 34 extends to the valve 38 and may extend in a vehicle-forward direction from the valve 38. The primary intake manifold 34 may be positioned to receive ambient air at the front end 44 of the vehicle 30 and shaped to deliver the air to the valve 38 and then to combine with fuel and supply the engine with an air-fuel mixture.

The primary intake manifold 34 extends to a first inlet 46. (The adjectives "first" and "second" are used throughout this document as identifiers and are not intended to signify importance or order.) The first inlet 46 may face, e.g., a grill 48 of the vehicle 30 in a vehicle-forward direction. The first inlet 46 may be an opening allowing air to flow into the primary intake manifold 34.

With continued reference to FIG. 1, the secondary intake manifold 36 is configured for the engine compartment 42 of the vehicle 30. In other words, the secondary intake manifold 36 is sized and shaped to extend in the engine compartment 42 along with the engine. The secondary intake manifold 36 extends from outside the engine compartment 42 to the valve 38. The secondary intake manifold 36 may be positioned to receive ambient air and shaped to deliver the air to the valve 38 and then to combine with fuel and supply the engine with an air-fuel mixture. The secondary intake manifold 36 may be smaller than the primary intake manifold 34. The secondary intake manifold 36 may be sized to deliver sufficient air for the vehicle 30 to operate in a limp-home mode (described below) but may not deliver sufficient air for the vehicle 30 to operate in a normal mode.

The secondary intake manifold 36 is arrangeable to extend from outside the engine compartment 42 from a second inlet 50 to the valve 38. The second inlet 50 of the secondary intake manifold 36 may be arrangeable above a beltline 52 of the vehicle 30 or at a roof 54 of the vehicle 30. In other words, the secondary intake manifold 36 may be shaped so that when installed in the vehicle 30, the second inlet 50 is disposed above the beltline 52 of the vehicle 30 or at the roof 54 of the vehicle 30. The second inlet 50 may be an opening allowing air to flow into the secondary intake manifold 36.

With reference to FIGS. 1 and 2, the valve 38 is connected to each of the primary and secondary intake manifolds 34, 36. The valve 38 may be disposed in the engine compartment 42. The valve 38 accepts air from the primary intake manifold 34 and the secondary intake manifold 36 and directs the air to the engine to mix with the fuel before supplying the engine. The valve 38 may be actuated to a first position allowing full airflow from the primary intake manifold 34 and blocking airflow from the secondary intake manifold 36, to a second position allowing full airflow from the secondary intake manifold 36 and blocking airflow from the primary intake manifold 34, and to intermediate positions allowing partial airflow divided between both intake manifolds 34, 36. The valve 38 may be in communication with and controllable by the computer 40.

With reference to FIG. 2, the intake system 32 may include one or more sensors 56 in communication with the computer 40. The sensors 56 may provide information relevant to possible flooding. The sensors 56 may include a camera, a radar, a pressure sensor, a hygrometer, a rain sensor, etc. The sensors 56 may be disposed at various positions on the vehicle 30. For example, the pressure sensor and the hygrometer may be disposed at the first inlet 46.

With continued reference to FIG. 2, a control system 58 includes the computer 40, the sensors 56, the valve 38, and a transmitter 60. The control system 58 may transmit signals through a communications network 62 such as a controller area network (CAN) bus, Ethernet, Local Interconnect Network (LIN), and/or by any other wired or wireless communications network, putting the computer 40 in communication with at least the sensors 56, the valve 38, and the transmitter 60.

The computer 40 is included in the vehicle 30 for carrying out various operations, including as described herein. The computer 40 is a computing device that generally includes a processor and a memory, the memory including one or more forms of computer-readable media, and storing instructions executable by the processor for performing various operations, including as disclosed herein. The memory of the computer 40 further generally stores remote data received via various communications mechanisms; e.g., the computer 40 is generally configured for communications on a controller area network (CAN) bus or the like, and/or for using other wired or wireless protocols, e.g., Bluetooth, etc. The computer 40 may also have a connection to an onboard diagnostics connector (OBD-II). Although one computer 40 is shown in FIG. 2 for ease of illustration, it is to be understood that the computer 40 could include, and various operations described herein could be carried out by, one or more computing devices.

The transmitter 60 may be connected to the communications network 62 and in communication with the computer 40. The transmitter 60 may be adapted to transmit signals wirelessly through any suitable wireless communication protocol, such as Bluetooth, WiFi, 802.11a/b/g, radio, etc. The transmitter 60 may be adapted to communicate with a remote server, that is, a server distinct and spaced from the vehicle 30. The remote server may be located outside the vehicle 30. For example, the remote server may be associated with other vehicles (e.g., V2V communications), infrastructure components (e.g., V2I communications), emergency responders, mobile devices associated with the owner of the vehicle 30, etc.

The vehicle 30 may be an autonomous vehicle. The computer 40 may be capable of operating the vehicle 30 independently of the intervention of a human driver, completely or to a greater or a lesser degree. The computer 40 may be programmed to operate the propulsion, brake system, steering, and/or other vehicle systems.

For purposes of this disclosure, an autonomous mode is defined as one in which each of a propulsion, a brake system, and a steering of the vehicle 30 are controlled by one or more computers; in a semi-autonomous mode computer(s) of the vehicle control(s) one or two of the propulsion, braking, and steering.

Figure 3:
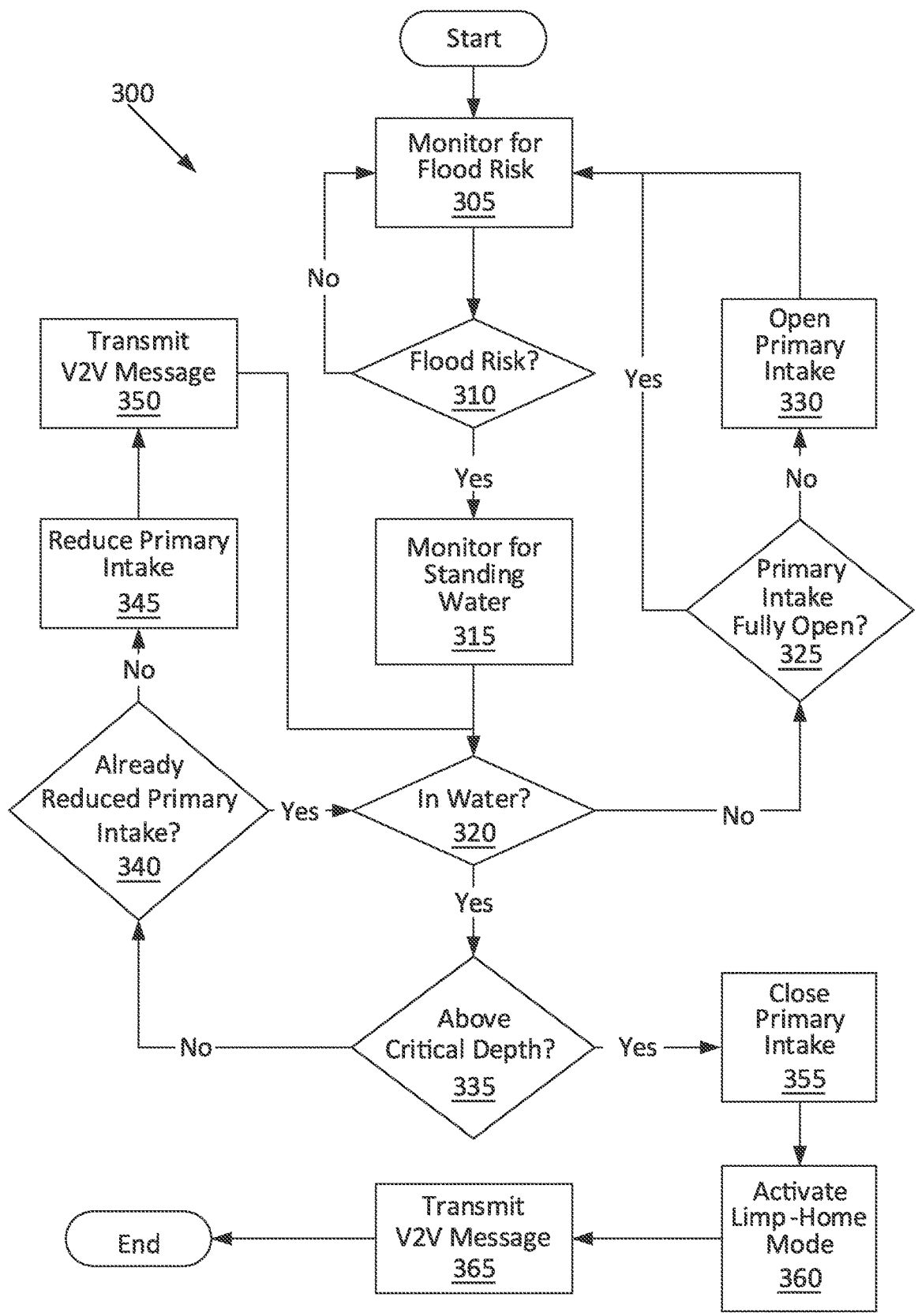
FIG. 3 is a process flow diagram of an exemplary process for the vehicle of FIG. 1 to respond to flood conditions.

FIG. 3 is a process flow diagram illustrating an exemplary process 300 for responding to flood conditions. The computer 40 is programmed to carry out the steps of the process 300.

The process 300 begins in a block 305, in which the computer 40 monitors for flood risk. The computer 40 receives data from the sensors 56 and analyzes whether the data indicate a flood risk. For example, a flood risk may be present if the rain sensor indicates heavy rain, that is, rain above a threshold. If the rain sensor is a vibration sensor coupled to a windshield, the threshold may be chosen to have a frequency or amplitude of vibration sufficiently high to correlate with, e.g., a 50 percent increase in flood risk. For another example, a flood risk may be present if the hygrometer indicates a moisture level above a threshold. The threshold may be chosen to indicate, e.g., humidity above 95%, submersion in water (humidity of 100%), etc. For a third example, a flood risk may be present if the camera sees standing water.

Next, in a decision block 310, the computer 40 identifies whether a flood risk is present based on the data. If a flood risk is not present, the process 300 proceeds back to the block 305 to continue monitoring for flood risk.

If a flood risk is present, next, in a block 315, the computer 40 monitors whether the vehicle 30 is in standing water. For example, the camera and/or the radar may identify standing water in a roadway, and the computer 40 may track the location of the vehicle 30 relative to the standing water. The computer 40 may receive signals from the sensors 56 indicating a depth of water and an inclination angle of the vehicle 30.

Next, in a decision block 320, the computer 40 determines whether the vehicle 30 is in water. If the vehicle 30 is in water, the process 300 proceeds to a block 335, described below.

If the vehicle 30 is not in water, next, in a decision block 325, the computer 40 determines whether the valve 38 is fully open to the primary intake manifold 34 and fully closed to the secondary intake manifold 36, that is, whether the valve 38 is in the first position. If the valve 38 is fully open to the primary intake manifold 34, the process 300 proceeds back to the block 305 to continue monitoring for flood risk.

If the valve 38 is not fully open to the primary intake manifold 34, next, in a block 330, the computer 40 instructs the valve 38 to fully open to the primary intake manifold 34 and close to the secondary intake manifold 36, that is, to actuate to the first position. After the block 330, the process 300 proceeds back to the block 305 to continue monitoring for flood risk.

After the decision block 320, if the computer 40 determines that the vehicle 30 is in water, next, in the decision block 335, the computer 40 determines whether the vehicle 30 is in water having at least a critical depth or in water below the critical depth. The critical depth may be, for example, a height of the first inlet 46 of the primary intake manifold 34. The computer 40 may use, for example, signals from the pressure sensor or the hygrometer attached to the first inlet 46 in order to determine whether the water is above or below the critical depth. If the computer 40 determines that the vehicle 30 is in water having at least the critical depth, the process 300 proceeds to a block 355, described below.

If the vehicle 30 is in water below the critical depth, next, in a decision block 340, the computer 40 determines whether the computer 40 has already actuated the valve 38 to decrease the airflow through the primary intake manifold 34; in other words, the computer 40 determines whether a block 345 below has already occurred at least once. If the computer 40 has already actuated the valve 38 to decrease the airflow through the primary intake manifold 34, the process 300 proceeds back to the decision block 320.

If the computer 40 has not already actuated the valve 38 to decrease the airflow through the primary intake manifold 34, next, in the block 345, the computer 40 actuates the valve 38 to increase airflow through the secondary intake manifold 36 and to decrease airflow through the primary intake manifold 34. The computer 40 may allow airflow through both intake manifolds 34, 36, that is, decrease airflow through the primary intake manifold 34 but not to zero flow, and increase airflow through the secondary intake manifold 36 but not to all the flow, in other words, to actuate the valve 38 to one of the intermediate positions.

Next, in a block 350, the computer 40 instructs the transmitter 60 to transmit a message to other vehicles. The message may comply with protocols and/or standards for V2V messaging. The message may include a location and/or depth of the standing water. After the block 350, the process 300 proceeds back to the decision block 320 to determine whether the vehicle 30 remains in the standing water.

After the decision block 335, if the computer 40 determines that the vehicle 30 is in water having at least the critical depth, in a block 355, the computer 40 actuates the valve 38 to increase airflow through the secondary intake manifold 36 and decrease airflow through the primary intake manifold 34. Specifically, the computer 40 may actuate the valve 38 to open fully to the secondary intake manifold 36 and close to the primary intake manifold 34, in other words, to actuate to the second position.

Next, in a block 360, the computer 40 activates the limp-home mode. The limp-home mode is a set of operating parameters for the engine of the vehicle 30 chosen to allow operation while minimizing damage to the engine from an issue with the engine. For example, the limp-home mode may limit the transmission to a single gear instead of allowing shifts between gears.

Next, in a block 365, the computer 40 instructs the transmitter 60 to transmit a message to other vehicles, as described above with respect to the block 350.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
a primary intake manifold and a secondary intake manifold configured for an engine compartment of a vehicle, the secondary intake manifold being arrangeable to extend from outside the engine compartment to a valve;
the valve connected to each of the primary and secondary intake manifolds; and
a computer in communication with the valve;
wherein the computer is programmed to:
identify a flood risk and then actuate the valve;
determine that the vehicle is in water;
determine that the vehicle is in the water having at least a critical depth; and
activate a limp-home mode in response to the determination that the vehicle is in the water having at least the critical depth.

2. The system of claim 1, wherein the computer is programmed to actuate the valve to increase airflow through the secondary intake manifold and decrease airflow through the primary intake manifold in response to the determination that the vehicle is in the water.

3. The system of claim 1, further comprising a transmitter in communication with the computer, wherein the computer is programmed to instruct the transmitter to transmit a message to other vehicles in response to the determination that the vehicle is in the water.

4. The system of claim 1, wherein the computer is programmed to actuate the valve to open fully to the secondary intake manifold and close to the primary intake manifold in response to the determination that the vehicle is in the water having at least the critical depth.

5. The system of claim 1, wherein the critical depth is a height of an inlet of the primary intake manifold.

6. The system of claim 5, wherein the computer is programmed to receive signals indicating the depth of the water and an inclination angle of the vehicle.

7. The system of claim 1, wherein the computer is programmed to determine that the vehicle is in the water below the critical depth.

8. The system of claim 7, wherein the computer is programmed to actuate the valve to increase airflow through the secondary intake manifold and decrease airflow through the primary intake manifold in response to the determination that the vehicle is in the water below the critical depth.

9. The system of claim 7, wherein the computer is programmed to allow airflow through both intake manifolds in response to the determination that the vehicle is in the water below the critical depth.

10. The system of claim 1, further comprising one or more sensors in communication with the computer, the computer being programmed to receive data from the one or more sensors and to identify the flood risk based on the data.

11. The system of claim 10, wherein the one or more sensors include at least one of a camera and a radar.

12. The system of claim 10, wherein the one or more sensors include at least one of a pressure sensor, a hygrometer, and a rain sensor.

13. The system of claim 1, wherein an inlet of the secondary intake manifold is arrangeable above a beltline of the vehicle.

14. The system of claim 13, wherein the inlet of the secondary intake manifold is disposed at a roof of the vehicle.

15. A system comprising:
a primary intake manifold and a secondary intake manifold configured for an engine compartment of a vehicle, the secondary intake manifold being arrangeable to extend from outside the engine compartment to a valve;
the valve connected to each of the primary and secondary intake manifolds;
a computer in communication with the valve; and
one or more sensors in communication with the computer, wherein the one or more sensors include at least one of a camera and a radar;
wherein the computer is programmed to:
receive data from the one or more sensors;
identify a flood risk based on the data; and
then actuate the valve.

16. The system of claim 15, wherein the computer is programmed to determine that the vehicle is in water having at least a critical depth, and activate a limp-home mode in response to the determination that the vehicle is in the water having at least the critical depth.

17. The system of claim 15, wherein an inlet of the secondary intake manifold is arrangeable above a beltline of the vehicle and disposed at a roof of the vehicle.

18. A system comprising:
a primary intake manifold and a secondary intake manifold configured for an engine compartment of a vehicle, the secondary intake manifold being arrangeable to extend from outside the engine compartment to a valve;
the valve connected to each of the primary and secondary intake manifolds; and
a computer in communication with the valve programmed to identify a flood risk and then actuate the valve;
wherein an inlet of the secondary intake manifold is arrangeable above a beltline of the vehicle and disposed at a roof of the vehicle.

19. The system of claim 18, wherein the computer is programmed to determine that the vehicle is in water having at least a critical depth, and activate a limp-home mode in response to the determination that the vehicle is in the water having at least the critical depth.

20. The system of claim 18, further comprising one or more sensors in communication with the computer, the computer being programmed to receive data from the one or more sensors and to identify the flood risk based on the data, wherein the one or more sensors include at least one of a camera and a radar.

* * * * *